United States Patent
McGloin

(10) Patent No.: US 11,006,587 B2
(45) Date of Patent: May 18, 2021

(54) MATERIAL APPLICATION SYSTEM WITH VIBRATING SAIL PLATE

(71) Applicant: DHG, Inc., Fairfield, OH (US)

(72) Inventor: Phillip Andrew McGloin, Fairfield, OH (US)

(73) Assignee: DHG, INC., Fairfield, OH (US)

( * ) Notice: Subject to any disclaimer, the term of this patent is extended or adjusted under 35 U.S.C. 154(b) by 0 days.

(21) Appl. No.: 16/555,496

(22) Filed: Aug. 29, 2019

(65) Prior Publication Data

US 2020/0068814 A1 Mar. 5, 2020

Related U.S. Application Data

(60) Provisional application No. 62/724,411, filed on Aug. 29, 2018.

(51) Int. Cl.
| | |
|---|---|
| *B65G 65/40* | (2006.01) |
| *B65G 65/30* | (2006.01) |
| *B65G 3/04* | (2006.01) |
| *A01G 13/02* | (2006.01) |

(52) U.S. Cl.
CPC ........... *A01G 13/025* (2013.01); *B65G 65/40* (2013.01)

(58) Field of Classification Search
None
See application file for complete search history.

(56) References Cited

U.S. PATENT DOCUMENTS

| | | | | |
|---|---|---|---|---|
| 5,927,617 A | * | 7/1999 | Musso, Jr. | B60P 1/36 239/657 |
| 6,276,516 B1 | * | 8/2001 | Bagust | B65G 47/19 198/530 |
| 7,540,436 B2 | * | 6/2009 | Truan | A01C 15/006 222/161 |
| 2018/0193880 A1 | * | 7/2018 | Dumbaugh | B65G 27/30 |

FOREIGN PATENT DOCUMENTS

| | | |
|---|---|---|
| CN | 201450764 | 5/2010 |
| CN | 201793183 | 4/2011 |
| CN | 104488426 | 4/2015 |
| CN | 107214082 | 9/2017 |
| CN | 206791003 | 12/2017 |
| FR | 2964297 | 12/2012 |

OTHER PUBLICATIONS

Casini, Fifteen-Year-Old Hispanic Youth Dies After Entering the Hopper of a Bark Blower—Maryland, Centers for Disease Control and Prevention, Feb. 13, 2006, NIOSH In-House Face Report Aug. 2004, USA.

* cited by examiner

*Primary Examiner* — Kavel Singh
(74) *Attorney, Agent, or Firm* — Dinsmore & Shohl LLP

(57) ABSTRACT

A material application system includes a hopper assembly and a conveyor assembly. The hopper assembly includes an upper portion and a downcomer portion. Bulk material is loaded into the upper portion and passes through the downcomer portion. The downcomer portion may include a sail plate for agitating the bulk material to inhibit the formation of clogs in the bulk material.

20 Claims, 8 Drawing Sheets

MATERIAL APPLICATION SYSTEM WITH VIBRATING SAIL PLATE

CROSS-REFERENCE TO RELATED APPLICATIONS

The present application claims priority to U.S. Provisional Patent Application Ser. No. 62/724,411, filed Aug. 29, 2018, and entitled "Material Application System with Vibrating Sail Plate," the entirety of which is incorporated by reference herein.

TECHNICAL FIELD

The present specification generally relates to industrial landscaping equipment for distributing loose bulk aggregate substances, for example, bark or mulch and, more specifically, to hoppers including a vibrating sail plate for distributing loose bulk aggregate substances.

BACKGROUND

A mulch is a layer of material applied to the surface of soil. Reasons for applying mulch include conservation of soil moisture, improving fertility and health of the soil, reducing weed growth, and enhancing the visual appeal of an area. A mulch is usually, but not exclusively, organic in nature. A mulch may be permanent (e.g. plastic sheeting) or temporary (e.g. bark chips). Mulches may be applied to bare soil or around existing plants. Mulches of manure or compost may incorporate into the soil by the activity of worms and other organisms. The application process is used both in commercial crop production and in gardening, and when applied correctly, can improve soil productivity.

However, due to some mulch being formed of a loose bulk material, such as wood chips, clumping may form in the material during packaging and shipping. Clumps of loose bulk material can cause uneven spreading of mulch in a particular area, which is not as efficient or aesthetically desired. Additionally, clumping loose bulk material can cause clogs and jams within mulch spreading apparatuses since the diameter of the clumps may be larger than a distribution opening of the apparatus. Accordingly, various methods for the distribution of mulch that prevents clumps of loose bulk material from passing through a spreading apparatus may be desired.

SUMMARY

In one embodiment, a material application system includes one or more of the features described and/or shown herein.

In another embodiment, a hopper assembly includes one or more of the features described and/or shown herein.

In yet another embodiment, a method of applying a bulk material includes using a material application system including one or more of the features described and/or shown herein.

In another embodiment, a hopper assembly includes a first side wall, a second side wall, a head plate, a ail plate, a sail plate, and a vibrator. The second side wall is parallel and spaced apart from the first side wall. The head plate is orthogonal to and extending from the first side wall to the second side wall at one end of the first side wall and the second side wall. The tail plate is orthogonal to and extending from the first side wall to the second side wall at an opposite end of the first side wall and the second side wall. The sail plate longitudinally extends between the head plate and the tail plate and is disposed between the first and second side walls. The sail plate includes a sweeping edge extending along the sail plate in the longitudinal direction. The vibrator is secured to the sail plate and configured to deliver vibrational energy to the sail plate, thereby causing the sweeping edge to deform in the lateral direction.

In another embodiment, a material application system includes a hopper assembly and a conveyor assembly. The hopper assembly includes a first side wall, a second side wall, a head plate, a ail plate, a sail plate, and a vibrator. The second side wall is parallel and spaced apart from the first side wall. The head plate is orthogonal to and extending from the first side wall to the second side wall at one end of the first side wall and the second side wall. The tail plate is orthogonal to and extending from the first side wall to the second side wall at an opposite end of the first side wall and the second side wall. The sail plate longitudinally extends between the head plate and the tail plate and is disposed between the first and second side walls. The sail plate includes a sweeping edge extending along the sail plate in the longitudinal direction. The vibrator is secured to the sail plate and configured to deliver vibrational energy to the sail plate, thereby causing the sweeping edge to deform in the lateral direction. The conveyor assembly includes a belt and a motor. The motor is arranged to rotate the belt, where the conveyor assembly is arranged beneath the hopper assembly.

In yet another embodiment, a method of removing loose bulk material from a hopper assembly includes depositing the loose bulk martial into the hopper assembly. The hopper assembly includes a first side wall, a second side wall, a head plate, a tail plate, a sail plate, and a vibrator. The second side wall is parallel and spaced from the first side wall. The head plate is orthogonal to and extending from the first side wall to the second side wall at one end of the first side wall and the second side wall. The tail plate is orthogonal to and extending from the first side wall to the second side wall at an opposite end of the first side wall and the second side wall. The sail plate longitudinally extends between the head plate and the tail plate and is disposed between the first and second side walls. The sail plate includes a sweeping edge extending along the sail plate in the longitudinal direction. The vibrator is secured to the sail plate. The method further includes activating the vibrator, where the vibrator is configured to deliver vibrational energy to the sail plate. The delivery of vibrational energy to the sail plate causes the sweeping edge to deform in the lateral direction. The method further includes contacting the loose bulk material with the sail plate, and removing the loose bulk material from the hopper assembly via a conveyor assembly arranged beneath the hopper assembly.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1A:
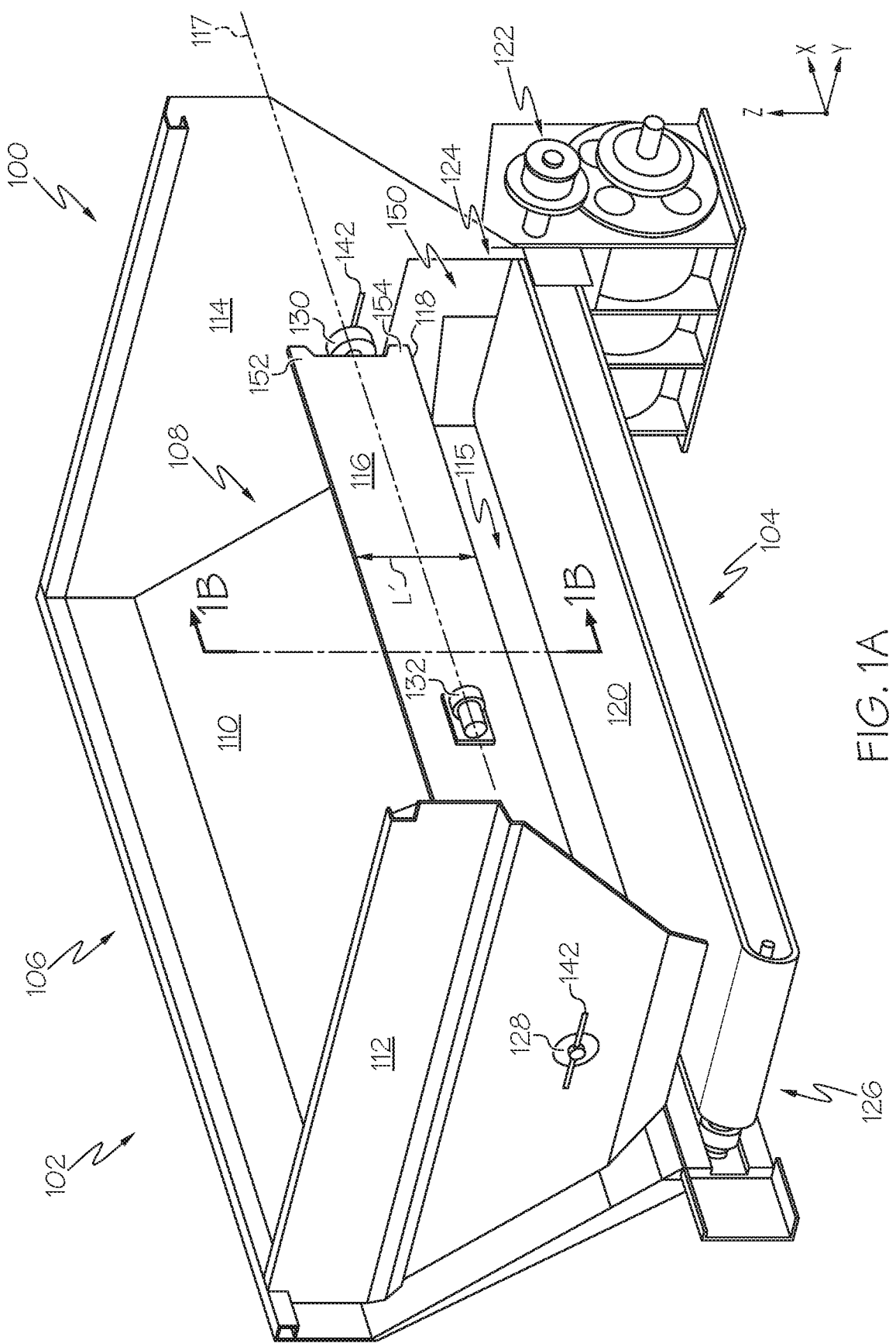
FIG. 1A depicts an example embodiment of a system for applying mulch including a hopper assembly with a single-axis sail plate and a conveyor assembly, according to one or more embodiments shown and described herein.

FIG. 1A generally depicts a material application system including a hopper assembly including a hopper and a conveyor assembly including a conveyor belt and a motor. A loose, spreadable material (e.g., bulk mulch, grain, etc.) may be loaded into an upper portion of the hopper. The bulk material may continue through a downcomer portion where it may pass through a downcomer aperture that directs the material onto the belt of the conveyor. The conveyor may move the material forward (i.e., the +X direction of the depicted coordinate axes) with respect to the hopper into an area of relatively low pressure, where the material may be blown from the material application system onto an application area (e.g., a field, a lawn, a garden, a flower bed, or the like). To prevent the material from accumulating or clotting into portions within the downcomer portion and inhibiting and/or blocking the flow of material from the hopper to the conveyor, the downcomer portion may include a device or combination of devices for agitating the material. For example, the downcomer portion may include a sail plate with a sweeping edge that sweeps side to side within the downcomer portion agitating the material. Accordingly, large chunks or clots of material may be separated such that portions of the material do not inhibit or block the flow of other portions of the material through the hopper assembly and the material application system. Specific elements and distinct embodiments of the material application system are described in greater detail herein.

Throughout the present specification, embodiments are described with respect to the application of mulch. While the particular embodiments shown in the figures are described with respect to the application of mulch, it is to be understood that mulch is merely one of many kinds of materials that can be applied using the material application system described herein and that, accordingly, any loose, spreadable material could be applied with one or more embodiments of the material application system.

For a cantilevered beam with a uniform mass distribution (i.e., no mass concentrated at the tip of the beam), the mass elements which are accelerated perpendicular to the axis of the beam may experience differing lateral displacement based on the distance from the *nexus* of rotation (i.e., the beam bends along its length). However, the period of displacement (i.e., the length of time of displacement) is the same for every element along the length of the beam because each element along the length of the beam vibrates at the same frequency. Accordingly, the natural frequency for all points along a length of the beam can be determined assuming uniform properties along a cross section of the beam. Certain embodiments described herein may be modeled as uniform cantilevered beams. Determining the natural frequency of such beams may be desirable because the beam can absorb maximum vibrational energy at its natural frequency as described above allowing the beam to experience maximum deflection based on absorbing the maximum vibrational energy.

Mechanical resonance is the tendency of a mechanical system to respond at greater amplitude when the frequency of its oscillation matches the natural frequency of the system. Accordingly, the amplitude of vibration of a mechanical system can be increased by approaching or operating at the system's natural frequency as compared with other frequencies. The natural frequency of a simple harmonic oscillator depends on both the stiffness k of the elastic member in the system and the mass which is being accelerated/decelerated.

Referring now to FIG. 1A, a material application system 100 is shown. The material application system 100 generally includes a hopper assembly 102 and a conveyor assembly 104. The hopper assembly 102 generally includes an upper portion 106 and a downcomer portion 108. The boundaries of the upper portion 106 and the downcomer portion 108 may be formed by a pair of opposing sidewalls 110, a head plate 112 and a tail plate 114. The side walls 110 may be parallel and spaced opposite from one another as the side walls 110 extend between the head plate 112 and the tail plate 114. Additionally, the head plate 112 and tail plate 114 may be orthogonal to and extending from the side walls 110. FIG. 1A shows a cutaway of the hopper assembly 102 with one of the opposing sidewalls 110 removed so that the internal features of the hopper assembly 102 can be seen. The downcomer portion 108 may end at a downcomer aperture 115 that generally separates the hopper assembly 102 from the conveyor assembly 104. The side walls 110 may be tapered inwardly to form the downcomer portion 108 of the hopper assembly 102. The downcomer portion 108 may be configured to direct loose bulk material towards a sail plate 116 and the conveyor assembly 104. Loose bulk aggregate substances, such as mulch or bark, may be loaded into the hopper assembly 102 and pass through the downcomer aperture 115 to the conveyor assembly 104 for distribution by the material application system 100 as will be described in greater detail herein.

Referring still to FIG. 1A, to inhibit loose bulk aggregate material from forming clogs in the downcomer aperture 115, the hopper assembly 102 includes a sail plate 116. In the embodiment illustrated, the sail plate 116 is disposed between the head plate 112 and the tail plate 114. The sail plate 116 extends in the longitudinal direction (+/−X of the depicted coordinate axes) and may be moveably coupled to the hopper assembly 102 at a head damper 128 and a tail damper 130. The sail plate 116 includes a vibrator 132 for actuating the sail plate 116 such that the sail plate 116 reciprocates about a centerline 117. In the particular example embodiment shown, the vibrator 132 is a hydraulic turbine vibrator. A sweeping edge 118 of the sail plate 116 may extend along the sail plate 116 in the longitudinal direction and may agitate the bulk material placed in the hopper assembly 102 as will be described in greater detail herein. The sail plate 116 may also include wings 152, 154. The wings 152, 154 may extend the sail plate 116 to the head plate 112 and the tail plate 114 but may provide a clearance for the dampers.

Still generally referring to FIG. 1A, the conveyor assembly 104 may include a belt 120 and a motor 122 for actuating the belt 120 to rotate about a first end 124 and a second end 126. The belt 120 may move bulk material that passes through the downcomer aperture 115 onto the belt 120 forward (+X direction) through an aperture 150 into an area of low pressure that is created by a blower (not shown). The blower may deposit the bulk material externally.

Referring more specifically to the hopper assembly 102 of the material application system 100, the upper portion 106 may include a void formed by the opposing sidewalls 110, the head plate 112, and the tail plate 114. For example, the upper portion 106 may define a substantially rectangular void that is wider than the downcomer portion 108 and that provides a larger area for a user to deposit bulk material within the hopper assembly 102.

As shown in FIG. 1A, in the downcomer portion 108, the opposing sidewalls 110 may slope toward and away from one another along the vertical direction (+/−Z). The opposing sidewalls 110 may direct the bulk material to the downcomer aperture 115 and onto the belt 120. Accordingly, the downcomer aperture 115 may be narrower in a horizontal plane (i.e., extending in the +/−X and +/−Y directions) than the belt 120. Bulk material may be directed downward and inward by the force of gravity and the opposing sidewalls 110, respectively.

In some embodiments, one or more of the walls of the hopper assembly 102 (e.g., the head plate 112, the tail plate 114, and the opposing sidewalls 110) may be formed from a durable material that holds its shape against the weight of the bulk material. For example, the walls may be formed from a material such as a metal or metal alloy like steel, copper, tin, aluminum, or a thermoset polymer such as polyethylene (PE), or a composite material, for example fiberglass. The walls may be strong enough to hold enough bulk material to fill both the downcomer portion 108 and the upper portion 106 simultaneously.

Figure 4:
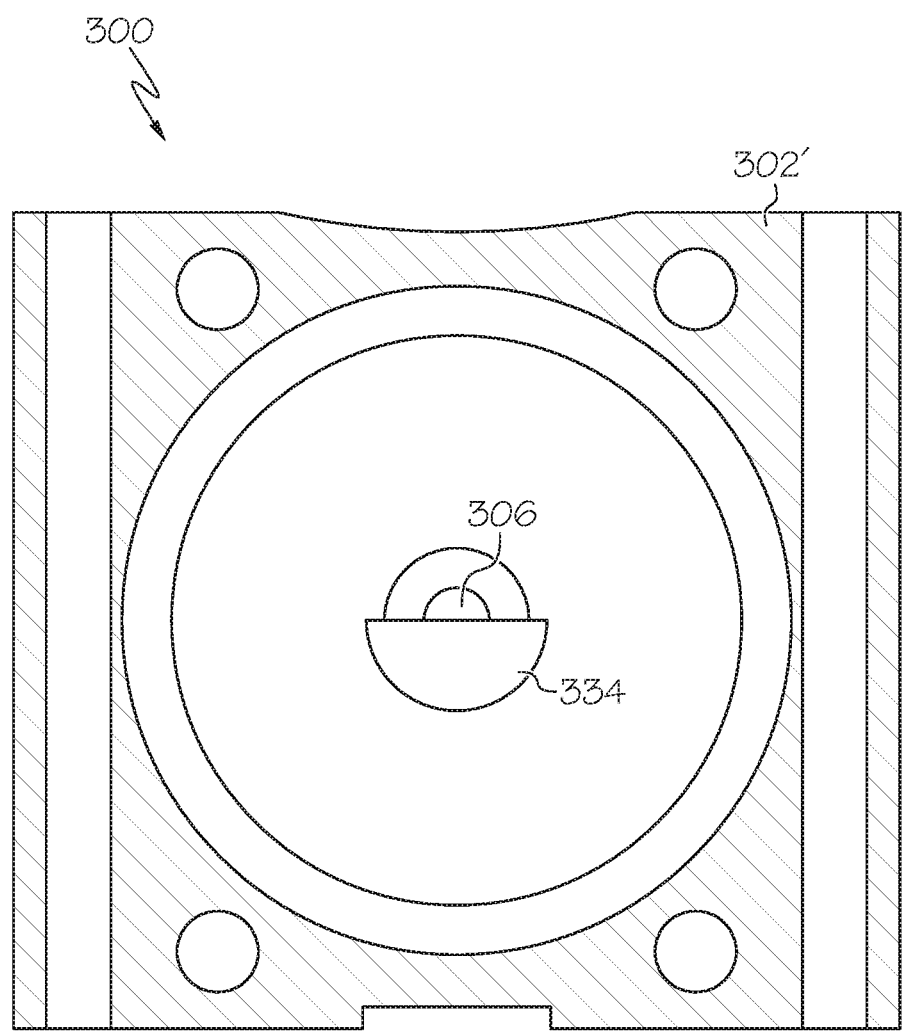
FIG. 4 depicts a cross section of the hydraulic motor casing showing an eccentric weight mechanically coupled to a rotor, according to one or more embodiments shown and described herein.

Referring still to FIG. 1A, the sail plate 116 also includes a vibrator 132 for actuating the sail plate 116 and causing the sail plate 116 to agitate the bulk material. As shown in FIG. 1A, the vibrator 132 for actuating the sail plate 116 may be mechanically coupled to the sail plate 116 along a centerline 117 of the sail plate 116 and configured to vibrate the sail plate 116. For example, the vibrator 132 may be an HTV 300 as shown in FIG. 4 that is configured to reciprocate an eccentric weight 334. The HTV 300 may be configured to reciprocate the eccentric weight 334 at a speed that causes the sail plate 116 to reciprocate at a selectable frequency as described in greater detail herein. The momentum of the eccentric weight 334 may be transferred to the sail plate 116 through a mechanical connection between the sail plate 116 and the HTV 300. Accordingly, the HTV 300 may create a moment in the sail plate 116. The sail plate 116 may move and the sweeping edge 118 may reciprocate back and forth in the lateral direction (+/−Y direction), agitating the bulk material in the downcomer portion 108 removing clumps of material and causing the bulk material to flow through the hopper assembly 102 to the conveyor assembly 104.

Referring still to FIG. 1A, the head damper 128 and the tail damper 130 may be damper plates that mechanically couple the sail plate 116 along centerline 117 to the head plate 112 and the tail plate 114, respectively. The head damper 128 and the tail damper 130 may include a damper made from a relatively soft, durable substance as compared to the opposing sidewalls 110, head plate 112, and tail plate 114 of the hopper assembly 102 such as rubber or a durable plastic, such as neoprene, urethane elastomers, PE, high density urethane foams, and the like. The head damper 128 and the tail damper 130 may absorb the vibrational energy of the sail plate 116 to prevent vibrational energy from being transferred to the rest of the hopper assembly 102 and/or material application system 100. Such damping may reduce operational noises and vibrationally isolate the sail plate 116 from the hopper assembly 102. The absorption characteristics of one or more of the head damper 128 and the tail damper 130 may be tuned to provide optimum damping characteristics at the first harmonic of the sail plate 116. One or more of the head damper 128 and the tail damper 130 may be an elastomeric isolator or elastomeric vibration isolator. One or more of the head damper 128 and the tail damper 130 may dissipate energy using hysteretic damping. The head damper 128 and the tail damper 130 may be injection molded and assembled in the hopper assembly 102. Each of the dampers may include lateral supports 142 that fix the dampers to the head plate 112 and the tail plate 114.

In some embodiments, the sweeping edge 118 and its opposing edge may have a maximum displacement in the lateral direction (+/−Y direction of the depicted coordinate axes) when the vibrator 132 causes the sail plate 116 to vibrate at a first harmonic of the sail plate 116. A center of the sail plate 116 between the sweeping edge 118 and its opposing edge may experience minimal displacement so as to act as a node, while the sweeping edge 118 and its opposite edge at the top of the sail plate 116 may act as anti-nodes with maximum displacement from the node at the first harmonic of the sail plate 116 (see e.g., FIG. 1B). The first harmonic may be determined experimentally or calculated as described herein based on the dimensions and composition of the sail plate 116. When the sail plate 116 is vibrated at the first harmonic, the sweeping edge 118 may agitate the maximum possible amount of bulk material in the downcomer portion 108. Accordingly, the bulk material may continue to flow through the hopper assembly 102 to the conveyor assembly 104 at an efficient rate.

Still referring to FIG. 1A, in some embodiments, a length L' of the sail plate 116 is selected based on a clearance between the sweeping edge 118 of the sail plate 116 and the opposing sidewalls 110 of the hopper assembly 102. The clearance between the sweeping edge 118 of the sail plate 116 and the opposing sidewalls 110 may be selected such that clumps of bulk material greater than or equal to a particular size are affected by the sweeping edge 118.

Figure 1B:
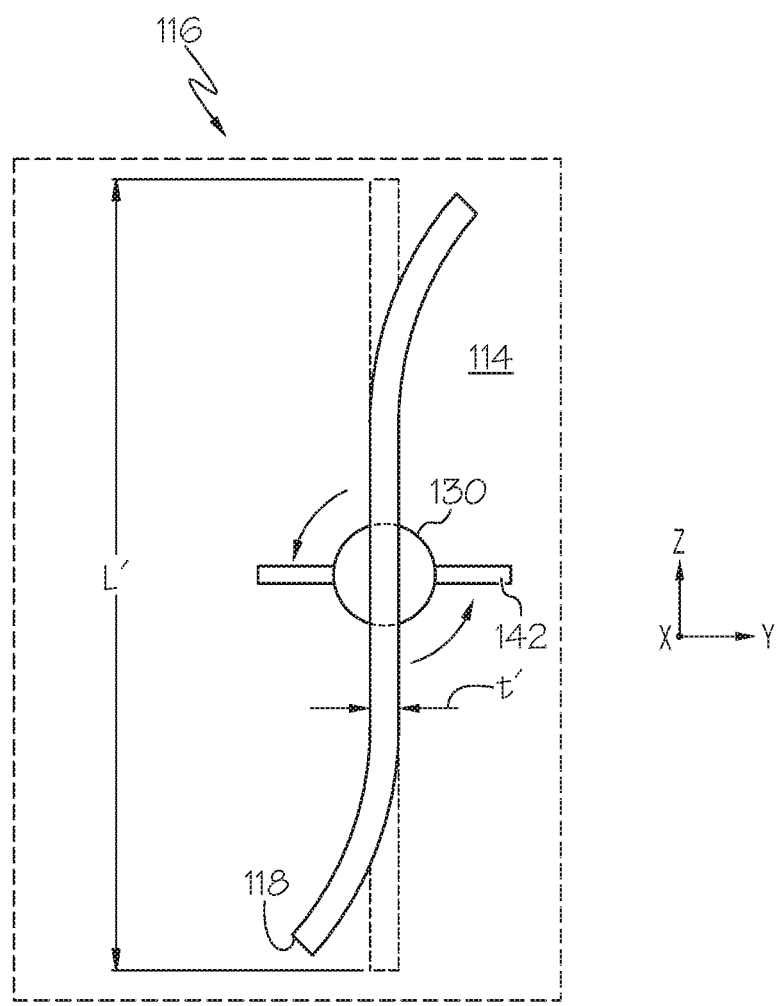
FIG. 1B depicts a sail plate of the hopper assembly of FIG. 1A in an excited state, according to one or more embodiments shown and described herein.

FIG. 1B shows a cross sectional view of the sail plate 116 as seen along a longitudinal dimension of the sail plate 116 (i.e., the +/−X direction of the depicted coordinate axes). The sail plate 116 has the length L'. The sail plate 116 is excited by the vibrator 132 (FIG. 1A) (e.g., the HTV 300 of FIG. 3) to a first harmonic. The sweeping edge 118 and its opposite edge are displaced a maximum distance from the rest position (e.g., a vertical position). The sail plate 116 rotates back and forth about the centerline 117 defined by the tail damper 130 and a head damper 128 (not shown).

The fundamental vibration frequency of a uniform cantilevered beam with a fixed end is:

$$\omega = k^2 \sqrt{\frac{EI}{\rho A L^4}}$$

where E is Young's modulus of the material, I is the moment of inertia, ρ is the material density, A is the cross sectional area of the beam, L is the length of the beam, and k is a dimensionless constant equal to approximately 1.875104.

Using the cross-section illustrated in FIG. 1B, the sail plate 116 can be modeled as a uniform cantilever beam with a fixed end and the fundamental vibration frequency of the sail plate 116 can be estimated using the equation above where L=L'/2 and the area A is calculated by multiplying the thickness t' of the sail plate 116 by L'/2. Accordingly, a motor or other vibrating element may be used to excite vibration in the sail plate 116 at the fundamental vibration frequency to cause the sweeping edge 118 to displace to its maximum lateral displacement.

Figure 2A:
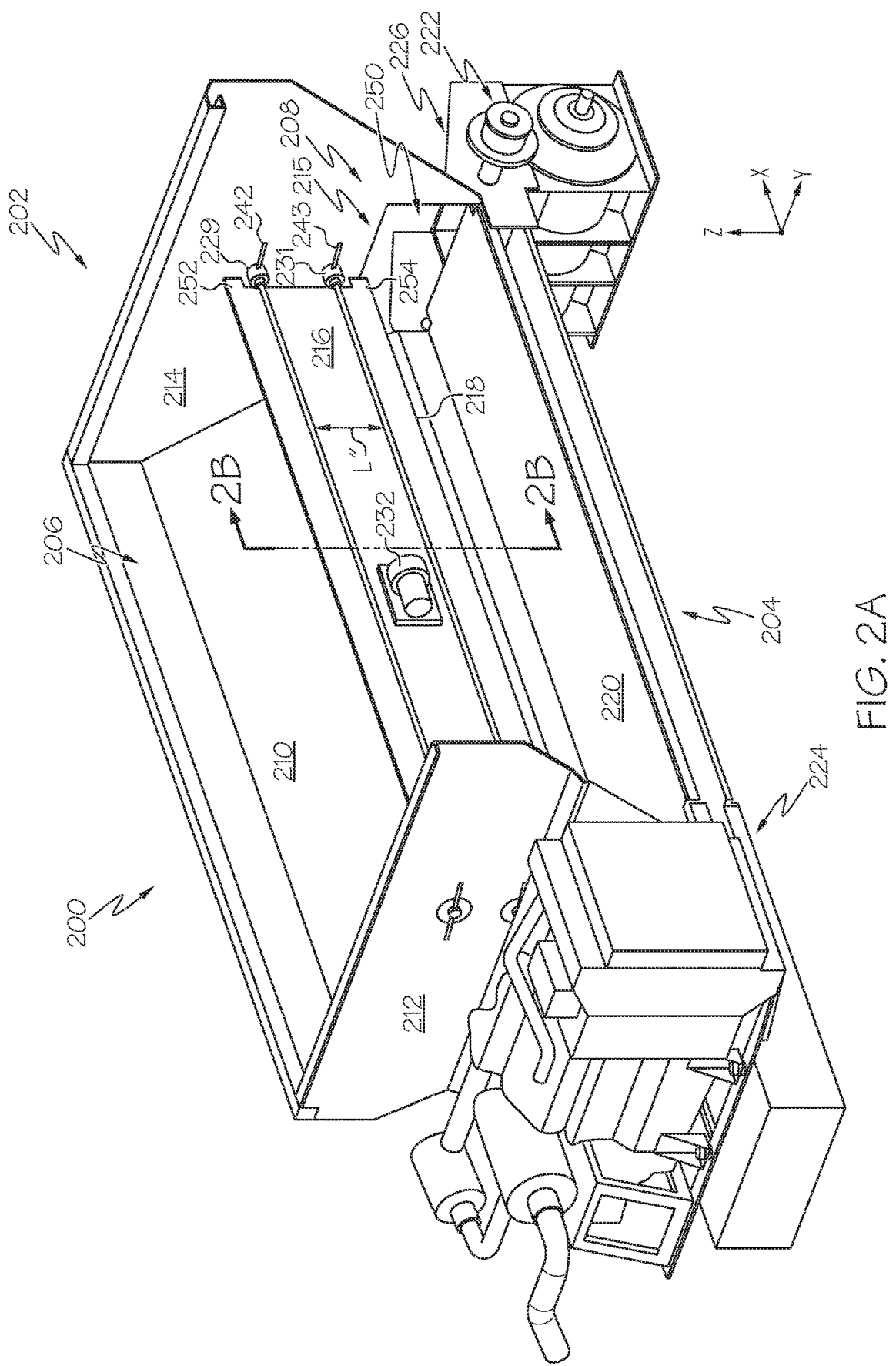
FIG. 2A depicts another example embodiment of a system for applying mulch including a hopper assembly with a biaxial sail plate and a conveyor assembly, according to one or more embodiments shown and described herein.

Referring now to FIG. 2A, another embodiment of a material application system 200 is shown. The material application system 200 generally includes a hopper assembly 202 and a conveyor assembly 204. The hopper assembly 202 generally includes an upper portion 206 and a downcomer portion 208. The boundaries of the upper portion 206 and the downcomer portion 208 may be formed by a pair of opposing sidewalls 210 and a head plate 212 and a tail plate 214. The side walls 210 may be parallel and spaced from one another as the side walls 210 extend between the head plate 212 and the tail plate 214. The side walls 210 may be tapered inwardly to form the downcomer portion 208 of the hopper assembly 202. The downcomer portion 208 may be configured to direct loose bulk material towards a sail plate 216 and the conveyor assembly 204. FIG. 2A shows a cutaway of the hopper assembly 202 with one of the opposing sidewalls 210 removed so that the internal features of the hopper assembly 202 can be seen. The downcomer portion 208 may end at a downcomer aperture 215. A sail plate 216 may be disposed between the head plate 212 and the tail plate 214 and may be moveably coupled to the hopper assembly 202. The sail plate 216 may include a vibrator 232 for actuating the sail plate 216 such that a sweeping edge 218 of the sail plate 216 may extend along the sail plate 216 in the longitudinal direction and may agitate a bulk material placed in the hopper assembly 202 as will be described in greater detail herein. The sail plate 216 may also include wings 252, 254. The wings 252, 254 may extend the sail plate 216 to the head plate 212 and the tail plate 214, but provide a clearance for the dampers.

Still generally referring to FIG. 2A, the conveyor assembly 204 may include a belt 220 and a motor 222 for actuating the belt 220 to rotate about a first end 224 and a second end 226. The belt 220 may move bulk material that passes through the downcomer aperture 215 onto the belt 220 forward (+X direction) through an aperture 250 into an area of low pressure that is created by a blower (not shown). The blower may deposit the bulk material as directed by the user.

Still referring to FIG. 2A, the hopper assembly 202 of the material application system 200 includes the upper portion 206. The upper portion 206 may include a void formed by the opposing sidewalls 210, the head plate 212, and the tail plate 214. The void as defined by the upper portion 206 may be a substantially rectangular void that is wider than the downcomer portion 208. The upper portion 206 may provide a larger area for a user to deposit bulk material within the hopper assembly 202.

As shown in FIG. 2A, in the downcomer portion 208, the opposing sidewalls 210 may slope toward and away from one another along the vertical direction (+/−Z). The opposing sidewalls 210 may direct the bulk material to the downcomer aperture 215 and onto the belt 220. Accordingly, the downcomer aperture 215 may be narrower in a horizontal plane (i.e., extending in the +/−X and +/−Y directions of the depicted coordinate axes) than the belt 220. Bulk material may be directed downward and inward by the force of gravity and the opposing sidewalls 210, respectively.

In some embodiments, one or more of the walls of the hopper assembly 202 (e.g., the head plate 212, the tail plate 214, and/or the opposing sidewalls 210) may be formed from one or more of a durable material such as a metal or a metal alloy like steel, copper, tin, aluminum, or a thermoset polymer such as polyethylene (PE), or a composite material, for example fiberglass. The walls may be strong enough to hold enough bulk material to fill both the downcomer portion 208 and the upper portion 206 with bulk material simultaneously.

Still referring to FIG. 2A, the sail plate 216 may generally extend in a longitudinal direction (+/−X direction of the depicted coordinate axes) between the head plate 212 and the tail plate 214. The sail plate 216 may be moveably fixed to the head plate 212 and the tail plate 214 at a top head damper 228 and a top tail damper 229 and a bottom head damper 230 and a bottom tail damper 231 and the sail plate 216 may have two axes of rotation between respective dampers on opposite sides of the sail plate 216. The top head damper 228, the top tail damper 229, the bottom head damper 230, and the bottom tail damper 231 may be damper plates that mechanically couple the sail plate 216 to the head plate 212 and the tail plate 214, respectively. The top head damper 228 may be arranged above the bottom head damper 230 in the vertical direction, and the top tail damper 231 may be arranged above the bottom tail damper 231 in the vertical direction. The top head damper 228, top tail damper 229, bottom head damper 230, and bottom tail damper 231 may be dampers made from a relatively soft, durable substance as compared to the opposing sidewalls 210, head plate 212, and tail plate 214 of the hopper assembly 202, such as such as neoprene, urethane elastomers, PE, high density urethane foams, and the like. The top head damper 228, the top tail damper 229, the bottom head damper 230, and the bottom tail damper 231 may absorb the vibrational energy of the sail plate 216 to prevent transfer of the vibrational energy to the rest of the hopper assembly 202 and/or the material application system 200. The absorption characteristics of one or more of the top head damper 228, the top tail damper 229, the bottom head damper 230, and the bottom tail damper 231 may be tuned to provide optimum damping characteristics at the first harmonic of the sail plate 216. One or more of the top head damper 228, the top tail damper 229, the bottom head damper 230, and the bottom tail damper 231 may be an elastomeric isolator or elastomeric vibration isolator. One or more of the top head damper 228, the top tail damper 229, the bottom head damper 230, and the bottom tail damper 231 may dissipate energy using hysteretic damping. The top head damper 228, the top tail damper 229, the bottom head damper 230, and the bottom tail damper 231 may be injection molded and assembled in the hopper assembly 202. The dampers may include top lateral supports 242 and bottom lateral supports 243, respectively, that fix the dampers to the head plate 112 (FIG. 1A) and the tail plate 114.

The sail plate 216 also includes a vibrator 232 for actuating the sail plate 216 and causing the sail plate 216 to agitate the bulk material within the hopper assembly 202. As shown in FIG. 2A, the vibrator 232 for actuating the sail plate 216 may be mechanically coupled to the sail plate 216 and configured to vibrate the sail plate 216. The vibrator 232 may be coupled to a vertical and longitudinal centerline of the sail plate 216. In some embodiments, the vibrator 232 may be an HTV 300 as shown in FIG. 4 that is configured to reciprocate an eccentric weight such as the eccentric weight 334. The HTV 300 may be configured to reciprocate the eccentric weight 334 at a speed that causes the sail plate 216 to reciprocate at a selectable frequency as described in greater detail herein. The momentum of the eccentric weight 334 may be transferred to the sail plate 216 through a mechanical connection between the sail plate 216 and the HTV 300. Accordingly, the HTV 300 may create a moment in the sail plate 216. The sail plate 216 may move due to the vibrational energy from the vibrator 232 and the sweeping edge 218 may reciprocate back and forth in the lateral direction (+/−Y direction), agitating the bulk material in the downcomer portion 108 breaking up clumps of material and causing the bulk material to flow uniformly through the hopper assembly 102 to the conveyor assembly 104.

Figure 2B:
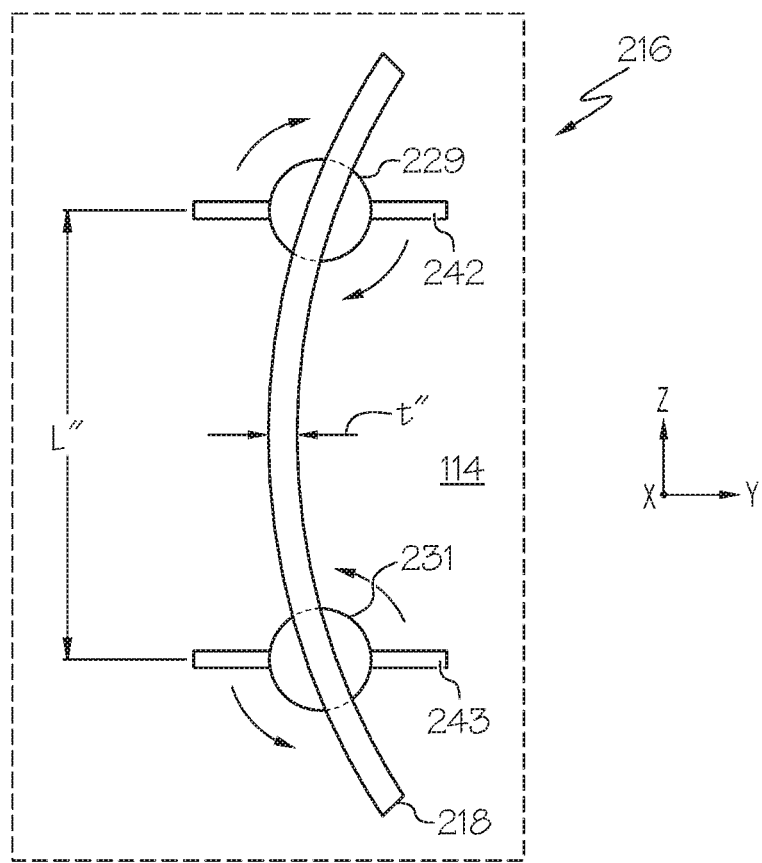
FIG. 2B depicts a sail plate of the hopper assembly of FIG. 2A in an excited state, according to one or more embodiments shown and described herein.

FIG. 2B shows a cross sectional view of the sail plate 216 as seen along a longitudinal dimension of the sail plate 216 (i.e., the +/−X direction of the depicted coordinate axes). The sail plate 216 has a length dimension L". The sail plate 216 is excited the vibrator 232 (e.g., the HTV 300 illustrated in FIG. 4) to a first harmonic. The sweeping edge 218 and its opposite edge at the top of the sail plate 216 are displaced a maximum distance from the rest position (e.g., a vertical position as shown in FIG. 2A). The sail plate 216 rotates about the top tail damper 229 and the bottom tail damper 231 and the top head damper 228 (not shown) and the bottom head damper 230 (not shown).

The fundamental vibration frequency for a beam with opposite fixed ends assuming a uniform load per unit length is:

$$\omega = k^2 \sqrt{\frac{EI}{\rho A L^4}}$$

where E is Young's modulus of the material, I is the moment of inertia, ρ is the material density, A is the cross sectional area of the beam, L is the length of the beam, and k is a dimensionless constant equal to approximately 4.730.

The sail plate 216 can be modeled as a uniform beam between opposite fixed ends and the fundamental vibration frequency of the sail plate 216 can be estimated using the equation above where L=L" and the area A is calculated by multiplying the thickness t" of the sail plate 216 by L". Accordingly, a vibrator 232 or other vibrating element may be used to excite vibration in the sail plate 216 at the fundamental vibration frequency to cause the sweeping edge 118 to displace to its maximum lateral displacement.

Figure 3:
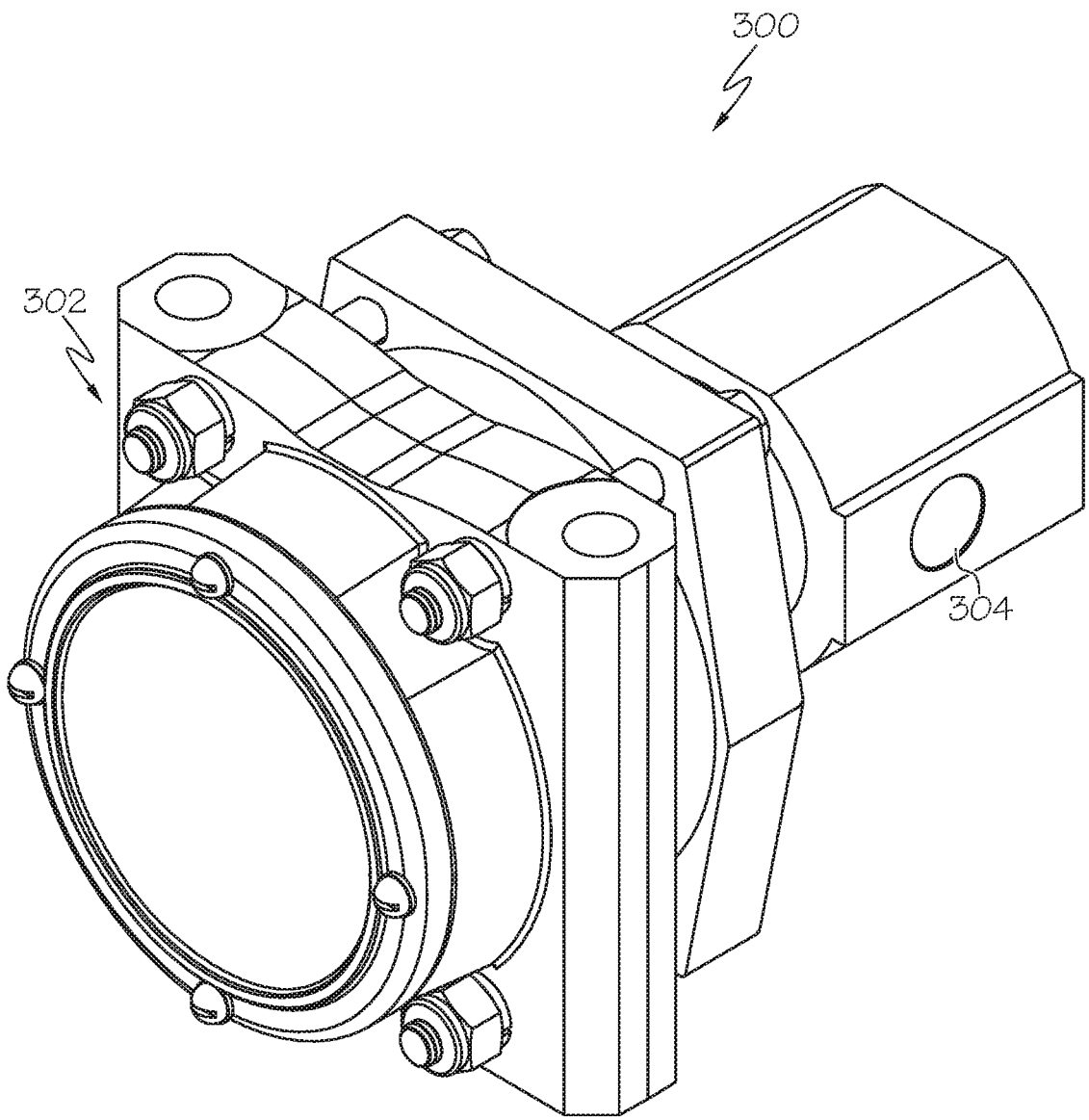
FIG. 3 depicts a hydraulic turbine vibrator (HTV) that includes a hydraulic turbine that drives a rotor coupled to an eccentric weight for vibrating a sail plate, according to one or more embodiments shown and described herein.

Referring now to FIGS. 3 and 4, one particular example of an HTV 300 for actuating a sail plate, such as the sail plate 116 of FIG. 1A or the sail plate 216 of FIG. 2A, is shown. While the particular embodiment shown in FIG. 3 is the HTV 300, it is to be understood that other devices for inducing vibration in a sail plate are contemplated. For example, it is contemplated that an electric or pneumatic vibrator may be used. The HTV 300 includes a casing 302 that surrounds an eccentric weight 334 (FIG. 4) that is coupled to a shaft/rotor 306 and an inlet/outlet port 304 for the inlet and outlet of hydraulic fluid. The hydraulic fluid used may be any fluid with a relatively low viscosity and near-zero compressibility (e.g., a mineral oil or water based hydraulic fluid).

Generally speaking, an HTV includes an unbalanced turbine wheel that rotates inside a casing. The rotational movement of the unbalanced turbine wheel applies a centrifugal force to the casing, causing the entire casing to vibrate. The speed at which the HTV vibrates is based on, among other factors, the mass flow rate of hydraulic fluid through the input/output port. The vibrational frequency of the turbine is selectable, allowing a user to control the vibration of a tool to which the HTV 300 is attached, for example, the sail plate 216 (FIG. 2A). The HTV 300 may be communicatively coupled to a motor controller including a processor and a memory module for storing one or more machine readable instruction sets that, when read and executed by the processor, control the HTV 300. Additionally, the motor controller may be communicatively coupled to a communications module for connecting to one or more external processors, memory modules, or external networks such as a cloud network for controlling the HTV 300. The HTV 300 may include one or more sensors for sensing a rotational velocity of the HTV 300. The one or more sensors may provide a signal to the motor controller proportional to the rotational velocity of the HTV 300 and the motor controller may control the HTV based on, among other factors, the signal from the one or more sensors.

Referring to FIGS. 2A, 3, and 4, the rotational velocity of the vibrator 232 may be adjusted to the correct speed to excite the sail plate 216 to its first order harmonic by increasing or decreasing the flow rate of hydraulic fluid to the vibrator 232 through the inlet/outlet port 304. The vibrator 232 may vibrate the sail plate 216 between the top head damper 228, the top tail damper 229, the bottom head damper 230, and the bottom tail damper 231 causing the sweeping edge 218 to displace in the lateral direction. As the rotational velocity of the eccentric weight 334 approaches the natural frequency of the sail plate 216, more of the momentum of the vibrator 232 transfers to the sail plate 216 due to mechanical resonance and the amplitude of the displacement of the sweeping edge 218 increases. At the natural frequency of the sail plate 216, the amplitude of the displacement of the sweeping edge 218 is maximized.

Figure 5A:
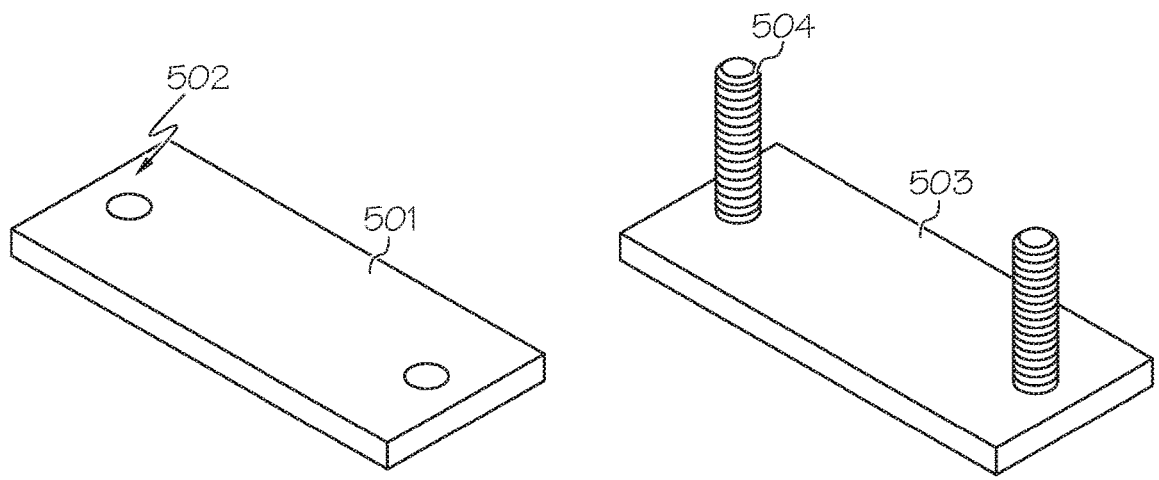
FIG. 5A depicts one embodiment of a mounting plate for mounting a hydraulic motor to a sail plate, according to one or more embodiments shown and described herein.
Figure 5B:
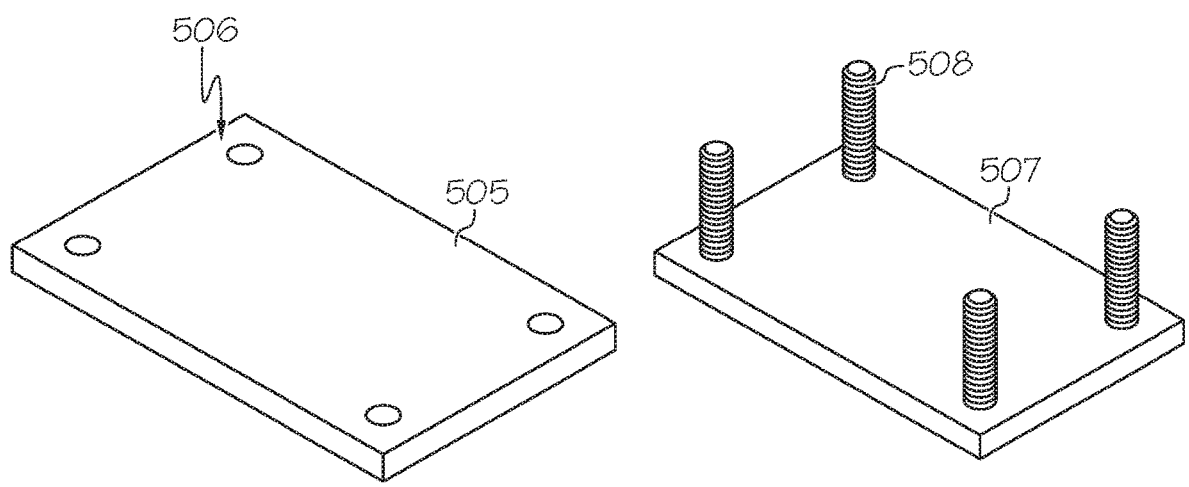
FIG. 5B depicts another embodiment of a mounting plate for mounting a hydraulic motor to a sail plate, according to one or more embodiments shown and described herein.

FIGS. 5A and 5B show two exemplary coupling plates for coupling the vibrator 132, 232 of FIGS. 1A and 2A to the sail plates 116, 216 of FIGS. 1A and 2A. FIG. 5A shows a coupling plate 501 including two bolt holes 502 and a matching bolt plate 503 with two bolts 504. The bolt plate 503 may be attached to the sail plate 116, 216 of FIGS. 1A and 2A. For example, the bolt plate 503 may be welded to the sail plate 116, 216. The coupling plate 501 may be attached to an HTV, or to another device for vibrating the sail plate 116, 216. For example, the coupling plate 501 may be welded to an HTV such as the HTV 300.

FIG. 5B shows a coupling plate 505 including four bolt holes 506 and a matching bolt plate 507 with four bolts 508. The bolt plate 507 may be attached to the sail plate 116, 216 of FIGS. 1A and 2A. For example, the bolt plate 507 may be welded to the sail plate 116, 216. The coupling plate 505 may be attached to an HTV, or to another device for vibrating the sail plate 116, 216. For example, the coupling plate 505 may be welded to the vibrator 132, 232 as shown in FIGS. 1A and 2A, respectively.

Figure 6:
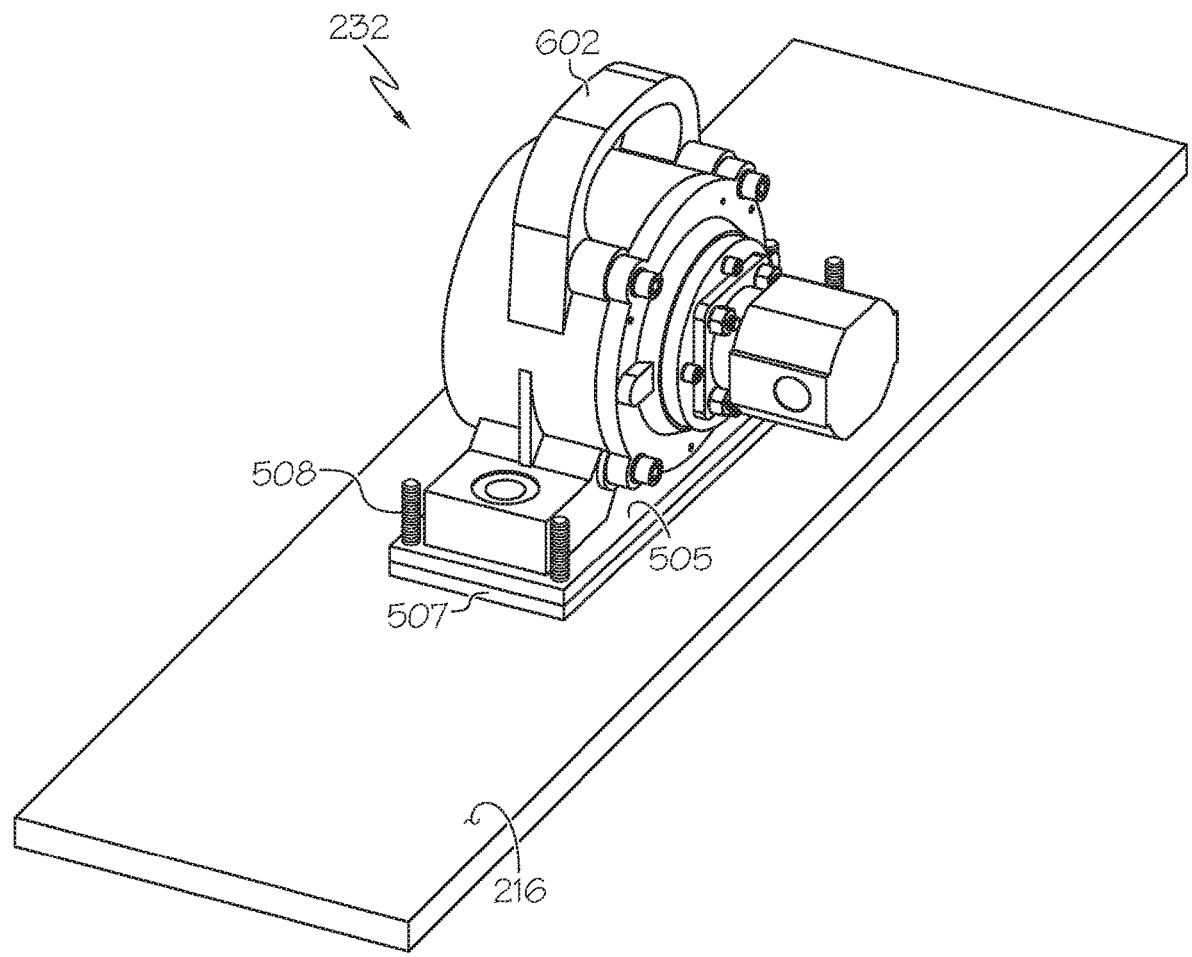
FIG. 6 depicts a hydraulic motor coupled to a sail plate, according to one or more embodiments shown and described herein.

FIG. 6 shows a vibrator 232 coupled to the sail plate 216. The vibrator 232 of FIG. 6 is welded to the coupling plate 505 and the bolt plate 507 is welded to the sail plate 216. The coupling plate 505 is thus fastened to the bolt plate 507 to join the vibrator 232 to the sail plate 216. The vibrator 232 includes the casing 302, the inlet/outlet port 304, and a handle 602. A user may position the vibrator 232 on the sail plate 216 using the handle 602.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A hopper assembly comprising:
   a first side wall;
   a second side wall parallel and spaced from the first side wall;
   a head plate orthogonal to and extending from the first side wall to the second side wall at one end of the first side wall and the second side wall;
   a tail plate orthogonal to and extending from the first side wall to the second side wall at an opposite end of the first side wall and the second side wall;
   a sail plate longitudinally extending between the head plate and the tail plate and disposed between the first and second side walls, the sail plate comprising a sweeping edge extending along the sail plate in the longitudinal direction; and
   a vibrator secured to the sail plate and configured to deliver vibrational energy to the sail plate, thereby causing the sweeping edge to bend in the lateral direction.

2. The hopper assembly of claim 1, wherein the sail plate is parallel to the first side wall and the second side wall.

3. The hopper assembly of claim 1, wherein the sail plate is secured to the head plate and tail plate by a head damper arranged in the head plate, and a tail damper arranged in the tail plate, the head damper and the tail damper being configured to vibrationally isolate the sail plate from the hopper assembly.

4. The hopper assembly of claim 1, wherein the sail plate is secured to the head plate and tail plate by a top head damper and a bottom head damper arranged in the head plate, wherein the top head damper is arranged above the bottom head damper in the vertical direction, and a top tail damper and a bottom tail damper arranged in the tail plate, wherein the top tail damper is arranged above the bottom tail damper in the vertical direction.

5. The hopper assembly of claim 1, wherein the vibrator is centered on the sail plate in the vertical direction and the longitudinal direction.

6. The hopper assembly of claim 5, wherein the vibrator is a hydraulic turbine vibrator comprising a hydraulic turbine that drives a rotor coupled to an eccentric weight for vibrating the sail plate.

7. The hopper assembly of claim 1, wherein the first side wall and the second side wall taper inwardly to form a downcomer portion of the hopper assembly, wherein the downcomer portion is configured to direct loose bulk material towards the sail plate.

8. A material application system, comprising:
   a hopper assembly comprising:
      a first side wall;
      a second side wall parallel and spaced from the first side wall;
      a head plate orthogonal to and extending from the first side wall to the second side wall at one end of the first side wall and the second side wall;
      a tail plate orthogonal to and extending from the first side wall to the second side wall at an opposite end of the first side wall and the second side wall;
      a sail plate longitudinally extending between the head plate and the tail plate and disposed between the first and second side walls, the sail plate comprising a sweeping edge extending along the sail plate in the longitudinal direction; and
      a vibrator secured to the sail plate and configured to deliver vibrational energy to the sail plate, thereby causing the sweeping edge to bend in the lateral direction; and
   a conveyor assembly comprising:
      a belt; and
      a motor arranged to rotate the belt, wherein the conveyor assembly is arranged beneath the hopper assembly.

9. The material application system of claim 8, wherein the sail plate is parallel to the first side wall and the second side wall.

10. The material application system of claim 8, wherein the sail plate is secured to the head plate and tail plate by a top head damper and a bottom head damper arranged in the head plate, wherein the top head damper is arranged above the bottom head damper in the vertical direction, and a top tail damper and a bottom tail damper arranged in the tail plate, wherein the top tail damper is arranged above the bottom tail damper in the vertical direction.

11. The material application system of claim 8, wherein the sail plate is secured to the head plate and tail plate by a head damper arranged in the head plate, and a tail damper arranged in the tail plate, the head damper and the tail damper being configured to vibrationally isolate the sail plate from the hopper assembly.

12. The material application system of claim 8, wherein the vibrator is a hydraulic turbine vibrator comprising a hydraulic turbine that drives a rotor coupled to an eccentric weight for vibrating the sail plate.

13. The material application system of claim 8, wherein the first side wall and the second side wall taper inwardly to form a downcomer portion of the hopper assembly, wherein the downcomer portion is configured to direct loose bulk material towards the sail plate.

14. A method of removing loose bulk material from a hopper assembly comprising:
   depositing the loose bulk martial into the hopper assembly, the hopper assembly comprising:
      a first side wall;
      a second side wall parallel and spaced from the first side wall;
      a head plate orthogonal to and extending from the first side wall to the second side wall at one end of the first side wall and the second side wall;

a tail plate orthogonal to and extending from the first side wall to the second side wall at an opposite end of the first side wall and the second side wall;

a sail plate longitudinally extending between the head plate and the tail plate and disposed between the first and second side walls, the sail plate comprising a sweeping edge extending along the sail plate in the longitudinal direction; and a vibrator secured to the sail plate;

activating the vibrator, wherein the vibrator is configured to deliver vibrational energy to the sail plate, thereby causing the sweeping edge to bend in the lateral direction;

contacting the loose bulk material with the sail plate;

removing the loose bulk material from the hopper assembly via a conveyor assembly arranged beneath the hopper assembly.

15. The method of claim 14, wherein the hopper assembly directs the loose bulk material onto the conveyor assembly after the loose bulk material contacts the sweeping edge of the sail plate.

16. The method of claim 14, wherein contacting the loose bulk material with the sweeping edge of the sail plate breaks apart any clumps formed in the loose bulk material.

17. The method of claim 14, wherein the sail plate is secured to the head plate and tail plate by a head damper arranged in the head plate, and a tail damper arranged in the tail plate, the head damper and the tail damper being configured to vibrationally isolate the sail plate from the hopper assembly.

18. The material application system of claim 14, wherein the sail plate is parallel to the first side wall and the second side wall.

19. The method of claim 14, wherein the vibrator is a hydraulic turbine vibrator comprising a hydraulic turbine that drives a rotor coupled to an eccentric weight for vibrating the sail plate.

20. The material application system of claim 14, wherein the first side wall and the second side wall taper inwardly to form a downcomer portion of the hopper assembly, wherein the downcomer portion is configured to direct loose bulk material towards the sail plate.

* * * * *